US011741579B2

United States Patent
Chi et al.

(10) Patent No.: US 11,741,579 B2
(45) Date of Patent: Aug. 29, 2023

(54) METHODS AND SYSTEMS FOR DEBLURRING BLURRY IMAGES

(71) Applicants: Zhixiang Chi, North York (CA); Yang Wang, Winnipeg (CA); Yuanhao Yu, Markham (CA); Jin Tang, Markham (CA)

(72) Inventors: Zhixiang Chi, North York (CA); Yang Wang, Winnipeg (CA); Yuanhao Yu, Markham (CA); Jin Tang, Markham (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 282 days.

(21) Appl. No.: 17/098,605

(22) Filed: Nov. 16, 2020

(65) Prior Publication Data

US 2022/0156891 A1    May 19, 2022

(51) Int. Cl.
*G06T 5/00*    (2006.01)
*G06N 3/08*    (2023.01)

(52) U.S. Cl.
CPC .............. *G06T 5/003* (2013.01); *G06N 3/08* (2013.01); *G06T 2207/20081* (2013.01); *G06T 2207/20084* (2013.01); *G06T 2207/20201* (2013.01)

(58) Field of Classification Search
CPC . G06T 2207/20081; G06T 2207/20084; G06T 7/251; G06T 9/002; G06T 5/003;
(Continued)

(56) References Cited

U.S. PATENT DOCUMENTS 11,263,726 B2 *    3/2022    Manimaran ........... G06T 3/4053
2011/0188770 A1    8/2011    Weinberger et al.
(Continued)

FOREIGN PATENT DOCUMENTS

CN    104680491 A    6/2015
CN    106548169 A    3/2017
(Continued)

OTHER PUBLICATIONS

Park, Seobin, et al., "Fast Adaptation to Super-Resolution Networks via Meta-Learning", arXiv preprint arXiv:2001.02905 (2020).
(Continued)

*Primary Examiner* — Ian L Lemieux
*Assistant Examiner* — Woo C Rhim

(57) ABSTRACT

Methods and systems for image deblurring are described. The weights of a deblurring network are first trained by meta-training the deblurring network on both a primary deblurring task and an auxiliary reconstruction task. Application-time training of the deblurring network is then performed, using an application-time blurry input image, to obtain values of application-time trained weights. Application-time training includes performing the auxiliary reconstruction task on the application-time blurry input image, and updating the weights of the deblurring network based on an auxiliary loss computed from the auxiliary reconstruction task. A deblurred output image is generated from the application-time blurry input image, using the application-time trained weights in the deblurring network.

20 Claims, 7 Drawing Sheets

(58) Field of Classification Search
CPC ............ G06T 2207/20201; G06T 7/20; G06N 3/0454; G06N 3/02; G06N 3/04; G06N 20/00; G06N 3/08; G06N 20/20; G06N 3/084; G06N 7/046; G06N 3/088; G06N 3/0445; G06V 10/82
See application file for complete search history.

(56) References Cited

U.S. PATENT DOCUMENTS

| | | | |
|---|---|---|---|
| 2015/0131898 A1 | 5/2015 | Schelten et al. | |
| 2018/0121767 A1 | 5/2018 | Wang et al. | |
| 2020/0104677 A1* | 4/2020 | Rae | G06N 3/0445 |
| 2021/0287047 A1* | 9/2021 | Gao | G06T 5/003 |

FOREIGN PATENT DOCUMENTS

| | | | | |
|---|---|---|---|---|
| CN | 107480772 A | | 12/2017 | |
| CN | 108510451 A | | 9/2018 | |
| CN | 108549892 A | | 9/2018 | |
| CN | 109919874 A | * | 6/2019 | ............ G06N 20/00 |
| CN | 110008817 A | | 7/2019 | |
| CN | 110060215 A | * | 7/2019 | ............ G06T 5/003 |
| CN | 110570375 A | | 12/2019 | |
| CN | 110728626 A | | 1/2020 | |
| CN | 110942436 A | * | 3/2020 | |
| CN | 111316316 A | | 6/2020 | |
| CN | 111340733 A | | 6/2020 | |
| CN | 111340733 A | * | 6/2020 | ......... G06K 9/00268 |
| CN | 111695421 A | * | 9/2020 | ......... G06K 9/00268 |
| CN | 111932480 A | * | 11/2020 | |
| CN | 113902647 A | * | 1/2022 | |
| KR | 20190114340 A | * | 10/2019 | |
| KR | 20220003946 A | * | 1/2022 | |
| WO | WO-2022005157 A1 | * | 1/2022 | ............... G06N 3/02 |

OTHER PUBLICATIONS

Finn, Chelsea, et al., "Model-Agnostic Meta-Learning for Fast Adaptation of Deep Networks", arXiv:1703.03400v3 [cs.LG], Jul. 18, 2017.
Ren, Dongwei, et al., "Neural Blind Deconvolution Using Deep Priors", https://arxiv.org/abs/1908.02197, Aug. 6, 2019.
Soh, Jae Woong, et al., "Meta-Transfer Learning for Zero-Shot Super-Resolution", Proceedings of the IEEE/CVF Conference on Computer Vision and Pattern Recognition. 2020.
Sun, Yu, et al., "Test-Time Training with Self-Supervision for Generalization under Distribution Shifts", International Conference on Machine Learning (ICML). 2020.
Zhang, Kaihao, et al., "Deblurring by Realistic Blurring", Proceedings of the IEEE/CVF Conference on Computer Vision and Pattern Recognition. 2020.
Kaihao Zhang et al., Deblurring by Realistic Blurring, 10 pages.
Hongguang Zhang et al., Deep Stacked Hierarchical Multi-patch Network for Image Debluring, 10 pages, Apr. 6, 2019.
Seobin Park et al., Fast Adaptation to Super-Resolution Networks via Meta-Learning, 16 Pages, Aug. 25, 2020.
Kaiyue Lu et al., From Depth What Can You See? Depth Completion via Auxiliary Image Reconstruction, 10 Pages.
Jae Woong Soh et al, Meta-Transfer for Zero-Shot Super-Resolution, 14 pages, Feb. 27, 2020.
Dongwon Park, Multi-Temporal Recurrent Neural Networks for Progressive Non-Uniform Single Image Deblurring With Incremental Temporal Training, 10 pages, Nov. 18, 2019.
Dongwei Ren et al., Neural Blind Deconvolution Using Deep Priors, 10 pages, Mar. 18, 2020.
Maitreya Suin et al., Spatially-Attentive Patch-Hierarchial Network for Adaptive Motion Deblurring, 10 pages, Apr. 11, 2020.
Yu Sun et al., Test-Time Training with Self-Supervision for Generalization under Distribution Shifts, 20 pages, Jul. 1, 2020.

* cited by examiner

602 — Input: $\theta = \{\theta^s, \theta^{pri}, \theta^{aux}\}, \alpha, \beta$

604 — While not converged:

606 • Sample a batch of training data $\{I_b^{(n)}, I_c^{(n)}\}_{n=1}^N$

608 • For each n in the batch do:

610 — Update the auxiliary branch:

612 $$\hat{\theta}^n \leftarrow \theta - \alpha \nabla_\theta L_{aux}\left(I_b^{(n)}, \hat{I}_b^{(n)}; \theta\right)$$

614 • end

616 • Update the primary branch:

618 $$\theta \leftarrow \theta - \beta \sum_n \nabla_\theta L_{pri}\left(I_c^{(n)}, \hat{I}_c^{(n)}; \hat{\theta}^n\right)$$

FIG. 6

METHODS AND SYSTEMS FOR DEBLURRING BLURRY IMAGES

FIELD

The present disclosure relate to the field of computer vision, in particular methods and systems for deblurring of blurry digital images.

BACKGROUND

Images captured by digital cameras are often degraded by undesirable blurry artifacts. Blurriness in an image captured by a digital camera may be due to motion of objects in a scene during image capture, movement of the digital camera during image capture, and low or insufficient lighting in the scene during image capture, among others. The task of processing a blurry image (i.e. an image with blurriness) to generate a clean image (i.e., a sharper image with little or no blurriness) is referred to as deblurring. Blurriness in an image can be uniform (i.e., every portion of the image is blurred by the same way, such as when the blurriness is due to shaking of a digital camera) or non-uniform (i.e., different portions of the image are blurred in different ways, such as when the blurriness is due to movement of objects in the scene). Non-uniform blurriness in an image may also be referred to as dynamic scene blurring, because the non-uniform blurriness in an image is frequently caused by dynamic motion by objects in the scene during image capture. Deblurring of images with non-uniform blurriness is typically challenging because the blurriness within the image is caused by a dynamic motion of objects in the scene during image capture which can be irregular and highly varied.

Some existing solutions for deblurring images (generally referred to as image deblurring) with dynamic scene deblurring make use of neural networks, and in particular neural networks that have been trained end-to-end for image deblurring (i.e., neural networks that have been trained to output a predicted deblurred image from a blurry image input to the neural networks). Such solutions typically require a large training dataset (e.g. a large set of labeled training data where the labeled training data is a blurry image paired with a ground truth clean image. It is difficult if not impossible to easily obtain real-life blurry and clean image pairs (e.g., a digital camera typically cannot capture both a blurry image and a clean image at the same time). Accordingly, synthetic data mimicking a blurry image is often included in the training dataset. For example, a blurry image may be synthetically generated by averaging a sequence of consecutive frames of a high frame rate video (e.g., 240 fps). Such a technique may simulate the blurriness caused by a long exposure time (e.g., when capturing an image in low lighting environments). The synthetic blurry image may then be paired with a single frame from the sequence as the ground truth clean image. However, the synthetic blurry image may not accurately reflect a real-life blurry image.

Another challenge for existing solutions for deblurring images is that it is difficult if not impossible to include all possible types of dynamic scene blurring in the training data, and doing so (if even possible) would lead to model overfitting. Existing solutions for deblurring images tend to be sensitive to the training data, meaning that the trained neural network performs wells for deblurring images that are similar to images in the training dataset, but performs poorly for images dissimilar to (e.g., falls outside the statistical distribution of) the training dataset. When the trained neural network is applied to a real-life blurred image that is dissimilar to the training dataset, the clean image output by the trained neural network may contain undesirable artifacts. The conventionally trained neural network is unable to adapt to the new blurry image.

Accordingly, it would be useful to provide a method and system for adaptive deblurring of blurry images.

SUMMARY

In various examples, the present disclosure describes methods and systems for deblurring of blurry images, using a neural network. The disclosed neural network is designed to perform both a primary task of deblurring an image and an auxiliary task. The auxiliary task is defined to relate to the primary task, but is designed to be easier to learn (e.g., does not require additional effort to collect ground-truth labels at test time). The disclosed examples enable the trained neural network to be further trained using a specific blurry input image (i.e. a specific blurry image input to the neural network) for a predetermined number of iterations, to update the weights of the trained neural network so that the weights of the neural network are tailored (i.e. adapted) for processing the specific blurry input image. After further training of the neural network is completed, the further trained neural network performs deblurring of the specific input blurry image to generate a clean image. The ability to tailor (i.e. adapt) the weights of the trained neural network with further training using a specific blurry input image and to deblur the specific blurry input image using the further trained neural network may be referred to herein as adaptive deblurring, and the further training of the trained neural network to adapt to the specific blurry input image may be referred to herein as application-time training.

Examples of the present disclosure may enable adaptive deblurring in real-life implementation (e.g., for deblurring of real-life images captured by a camera of an electronic device), and the neural network may be trained to deblur a real-life blurry image in the application stage. The present disclosure describes methods and systems that enable relatively fast application-time training (e.g., requiring only a few training iterations) of the neural network in the application stage, thus enabling on-the-fly adaptation of the weights of the neural network to perform deblurring of each specific real-life image. The disclosed methods and systems provide the technical effect that a specific blurry input image can be used to further train a trained neural network (e.g. a neural network which has been trained for deblurring blurry input images), on-the-fly in the application stage, to improve the performance of the trained neural network when deblurring the specific blurry input image as compared to deblurring the specific blurry input image using the originally trained neural network.

The application-time training of a trained neural network may be carried out on the auxiliary task (e.g. auxiliary reconstruction task) only, using relatively few iterations (e.g., ten or fewer iterations, or five or fewer iterations). This provides the technical effect that the application-time training of a trained neural network may be carried out on-the-fly in the application stage without requiring excessive use of memory resources and/or without excessive computing time, thus enabling executing by a system having limited resources, such as a handheld or mobile device (e.g., a smartphone, a tablet, or a laptop, among others).

Examples of the present disclosure may enable deblurring of images to generate higher quality clean output images, compared to some existing deblurring methods and systems. The disclosed methods and systems enable further training of a trained neural network to adapt the weights of the trained neural network to deblur a specific blurry input image, without requiring the ground truth (i.e., clean image) for that specific image.

In some example aspects, the present disclosure describes a method for image deblurring. The method includes obtaining a deblurring neural network with meta-trained weights, wherein the meta-trained weights are previously obtained by meta-training the deblurring neural network on both a primary deblurring task and an auxiliary reconstruction task. The method also includes obtaining an application-time blurry input image. The method also includes performing application-time training of the deblurring neural network with the meta-trained weights using the application-time blurry input image, to obtain application-time trained weights for the deblurring neural network, by: performing the auxiliary reconstruction task on the application-time blurry input image to predict a reconstructed blurry image; and updating the meta-trained weights of the deblurring neural network based on an auxiliary loss computed in accordance with an auxiliary loss function, the application-time blurry input image, and the reconstructed blurry image. The method also includes, after application-time training is complete, generating a deblurred output image from the application-time blurry input image using the deblurring neural network having application-time trained weights.

In any of the above examples, the application-time training may be performed for multiple iterations on the application-time blurry input image, the application-time blurry input image being a single blurry image, and each iteration may include performing the auxiliary reconstruction task and updating the weights of the deblurring neural network.

In any of the above examples, the application-time training may be performed for a maximum of five iterations.

In any of the above examples, the auxiliary reconstruction task may be performed with feature passing from the primary deblurring task.

In any of the above examples, the deblurring neural network may include: a shared subnetwork for processing the application-time blurry input image, the shared subnetwork being coupled to a primary subnetwork configured to perform the primary deblurring task and an auxiliary subnetwork configured to perform the auxiliary reconstruction task; the primary subnetwork comprising a primary output neural network layer for performing the primary deblurring task, the primary subnetwork processing output from the shared subnetwork to generate the deblurred output image; and the auxiliary subnetwork comprising an auxiliary output neural network layer for performing the auxiliary reconstruction task, the auxiliary subnetwork processing output from the shared subnetwork to generate the reconstructed blurry image.

In any of the above examples, features outputted by the primary output neural network layer may be copied to a neural network layer of the auxiliary subnetwork.

In any of the above examples, in the primary subnetwork, output from the primary output neural network layer may represent residual difference between the deblurred output image and the application-time blurry input image, and the residual difference may be added to the application-time blurry input image to generate the deblurred output image.

In any of the above examples, the meta-training of the deblurring neural network may be performed using a training dataset comprising input-output pairs of labeled training data.

In some example aspects, the present disclosure describes a method for training a deblurring neural network. The method includes initializing weights of the deblurring neural network. The method also includes performing a round of meta-training of the deblurring neural network on both a primary deblurring task and an auxiliary reconstruction task, to obtain values of meta-trained weights, by: sampling a sampled batch of training data, the sampled batch comprising blurry training images, each blurry training image being paired with a corresponding clean training image in the sampled batch; for each given blurry training image in the sampled batch, performing the auxiliary reconstruction task on the given blurry training image to predict a respective reconstructed blurry image, and computing a respective set of temporary weights based on an auxiliary loss computed in accordance with an auxiliary loss function, the given blurry training image, and the respective reconstructed blurry image; for each given pair of blurry training image and corresponding clean training image in the sample batch, performing the primary deblurring task to predict a respective predicted clean image, and computing a respective primary loss in accordance with a primary loss function, the corresponding clean training image, the respective predicted clean image, and the respective set of temporary weights; and updating the weights of the deblurring neural network using summed gradients of the respective computed primary losses. The method also includes, after meta-training is complete, storing the meta-trained weights, the deblurring neural network with the meta-trained weights being further trainable for application-time deblurring of blurry input images.

In any of the above examples, the auxiliary reconstruction task may be performed with feature passing from the primary deblurring task.

In any of the above examples, the deblurring neural network may include: a shared subnetwork for processing the blurry training images, the shared subnetwork being coupled to a primary subnetwork configured to perform the primary deblurring task and an auxiliary subnetwork configured to perform the auxiliary reconstruction task; the primary subnetwork comprising a primary output neural network layer for performing the primary deblurring task, the primary subnetwork processing output from the shared subnetwork to generate deblurred output images; and the auxiliary subnetwork comprising an auxiliary output neural network layer for performing the auxiliary reconstruction task, the auxiliary subnetwork processing output from the shared subnetwork to generate reconstructed blurry images.

In any of the above examples, features outputted by the primary output neural network layer may be copied to a neural network layer of the auxiliary subnetwork.

In any of the above examples, in the primary subnetwork, output from the primary output neural network layer may represent residual difference between the deblurred output image and the application-time blurry input image, and the residual difference may be added to the application-time blurry input image to generate the deblurred output images.

In some example aspects, the present disclosure describes a device including a processor configured to execute instructions to cause the device to perform any of the methods described above.

In some example aspects, the present disclosure describes a computer readable medium having instructions stored thereon, wherein the instructions, when executed by a processor of a computing device, cause the computing device to perform any of the methods described above.

BRIEF DESCRIPTION OF THE DRAWINGS

Reference will now be made, by way of example, to the accompanying drawings which show example embodiments of the present application, and in which:

FIG. 6 shows example pseudocode for implementing the example method of FIG. 5, in accordance with some embodiments of the present disclosure.

Similar reference numerals may have been used in different figures to denote similar components.

DESCRIPTION OF EXAMPLE EMBODIMENTS

Figure 1:
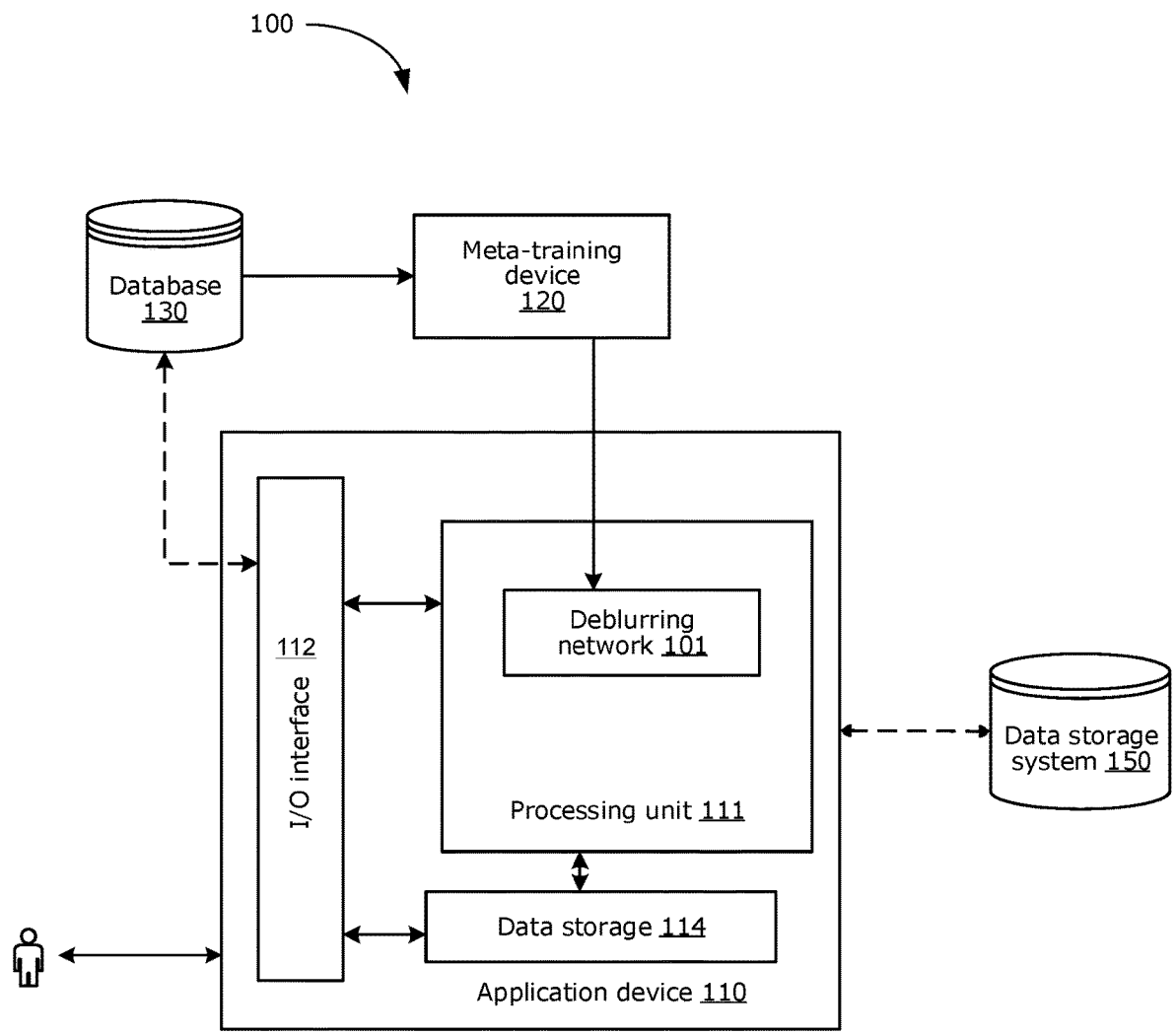
FIG. 1 is a block diagram showing an example system architecture that may be used for meta-training and application-time training, in accordance with some embodiments of the present disclosure.

The following describes technical solutions of this disclosure with reference to accompanying drawings.

The image deblurring methods and systems described in examples herein may be applied to a scenario in which a blurry digital image is to be deblurred. In the disclosed methods and systems, a neural network is first trained, using meta training, to perform both a primary task and an auxiliary task. The primary task generates a clean image from a blurry input image. The auxiliary task is defined to be a task that is related to the primary task, but is easier to learn. For example, the auxiliary task may be to reproduce the blurry input image. The result of meta-training are meta-trained weights for the neural network. The neural network and meta-trained weights may be provided or deployed to an application device (e.g., end consumer system), such as a handheld device, smartphone, tablet, or digital camera when the neural network has been meta-trained on a training device (e.g. computing system) other than the application device. When the neural network is trained on an application device, the meta-trained weights are stored in memory of the application device after training is complete. The neural network having the meta-trained weights may be further trained, in the application stage, using a specific blurry input image (that does not have a corresponding ground-truth output clean image) to update the meta-trained weights to application-time trained weights. After further training the neural network during the application stage, the neural network having the application-time trained weights may be used deblurr the specific blurry input image, in order to output a clean image. It should be noted that, after using the neural network with the application-time trained weights to output a clean image for the specific blurry input image, the application-time trained weights may be discarded. That is, the neural network may be retrained for deblurring each specific blurry input image, starting from the meta-trained weights. Thus, the disclosed methods and systems provide the technical effect that a blurry image can be deblurred, using a neural network that is further trained on-the-fly in the application stage. In the present disclosure, application stage refers to use of the deblurring network for real-life application (e.g., deblurring of real-life captured images), and may also be referred to as the inference stage, prediction stage or online stage.

The training of the neural network to update the meta-trained weights to application-time trained weights may be referred to as application-time training. The application-time training of the neural network is performed on the auxiliary task only. This may enable the application-time training of the neural network to be carried out using relatively few iterations (e.g., ten or fewer iterations, or five or fewer iterations), thus enabling the application-time training of the neural network to be carried out on-the-fly in the application stage without requiring excessive use of memory resources and/or without excessive computing time. The technical effect is that after the further training is complete, the trained neural network having application-time trained weights may be used to generate a high quality deblurred image from the real-life blurry input image, requiring relatively short computing time (e.g., less than one second) and on a system having limited resources, such as a handheld or mobile device (e.g., a smartphone, a tablet, or a laptop, among others), as well as a desktop device (e.g., desktop computers, or personal computing devices, among others).

To assist in understanding the present disclosure, some existing techniques for image restoration are now discussed. Some existing techniques are traditional techniques (i.e., not machine learning-based). Traditional techniques include, for example, performing deconvolution of an estimated blur kernel, based on an assumption that blurring is uniform across the entire image. Such techniques typically perform poorly when the blurring is non-uniform, and hence dynamic scene deblurring is typically challenging using traditional techniques.

Some attempts have been made to apply machine learning-based techniques to image restoration. For example, meta-learning (in particular model-agnostic meta-learning (MAML)) has been proposed as a solution for achieving single image super-resolution (SISR). SISR aims to obtain a high-resolution output image using only a single low-resolution input image. Using MAML, a neural network is trained quickly (e.g., within a few gradient steps, or training iterations) to adapt its learned weights and the neural network with the adapted learned weights is used to predict a high-resolution output image from a specific low-resolution input image. The further training of the neural network to adapt its learned weights and the use of the neural network with the adapted learned weights to predict a high resolution output image from a specific input image may be referred to as test-time training, because the specific input image may be considered a test of the adaptability of the neural network. Test-time training typically requires a neural network to be quickly trained (e.g., within a few gradient steps, or training iterations) to be of practical use, and typically also requires each input data (e.g., each test input image) to be paired with ground-truth output data (e.g., expected output image) in order to train the neural network. However, such an approach using test-time training may not be applicable to the problem of image deblurring, because the ground-truth output image cannot be obtained for a real-life blurry image.

Another machine learning-based technique that has been considered for image restoration is auxiliary learning. In auxiliary learning, an auxiliary task is defined which relates to the primary task (e.g., image deblurring), but is easier to learn. Some layers (and weights) of the neural network are shared between the auxiliary task and the primary task, such that updating the weights to improve performance of the neural network in the auxiliary task affects performance of the neural network in the primary task. An auxiliary task that supports learning of a primary deblurring task may be defined such that ground-truth output data can be easily obtained for each test input data during test-time training. However, such an approach typically results in little or no improvement in performance of the primary deblurring task, because the weights of the neural network are updated to favor only performance of the auxiliary task.

In various examples, the present disclosure describes methods and systems for image deblurring, which uses a neural network that is trained using training techniques (referred to herein as meta-auxiliary learning) that may achieve the benefits of both meta-learning and auxiliary learning. As will be discussed below, the disclosed methods and systems enable test-time training of a neural network using specific blurry input images which do not have corresponding ground-truth output clean images for fast adaptation (e.g., within a few training iterations) of the previously meta-trained weights of a neural network to improve the performance of the neural network in predicting clean output images from specific input blurry images. In examples disclosed herein, test-time training of the deblurring network may be performed to enable deblurring of real-life images during the application stage. Accordingly, the present disclosure may refer to test-time training of the deblurring network as application-time training. The application-time training is performed on the auxiliary task, but prior training of the neural network using meta-learning and the architecture of the neural network are designed to ensure that the primary deblurring task also benefits from the application-time training. Examples of the disclosed methods and systems may provide good performance in the presence of data distribution shift, in which blurriness of test images or real-life images may differ from the blurriness found in the training dataset.

In some examples, the present disclosure describes an example method of training a neural network to learn an image deblurring task. In particular, the present disclosure describes an example of training a neural network to adapt its weights in order to improve deblurring performance for a specific input image. The training method relates to processing of computer vision, and specifically, may be applied to a data processing method such as data training, machine learning, or deep learning, to perform symbolic and formalized intelligent information modeling, extraction, preprocessing, training, and the like on training data (such as blurry image data in the context of this disclosure), to obtain a trained neural network as discussed further below. In addition, the present disclosure describes an example method for deblurring an image, which may be performed using the foregoing trained neural network. In examples discussed herein, input data (such as real-life blurry image data) is used to further train a trained neural network, to obtain output data (such as a deblurred image). It should be noted that the training method for the neural network and the deblurring method described herein may be considered aspects based on a same idea, or may be considered as two parts of a system or two stages of an entire procedure: for example, a model training stage and a model application stage.

Generally, examples disclosed herein relate to a large quantity of neural network applications. For ease of understanding, the following describes some concepts relevant to neural networks and some relevant terms that may be related to examples disclosed herein.

A neural network consists of neurons. A neuron is a computational unit that uses $x_s$ and an intercept of 1 as inputs. An output from the computational unit may be:

$$h_{W,b}(x) = f(W^T x) = f\left(\sum_{s=1}^{n} W_s x_s + b\right)$$

where s=1, 2, ... n, n is a natural number greater than 1, $W_s$ is a weight of $x_s$, b is an offset (i.e. bias) of the neuron and f is an activation function of the neuron and used to introduce a nonlinear feature to the neural network, to convert an input of the neuron to an output. The output of the activation function may be used as an input to a neuron of a following convolutional layer in the neural network. The activation function may be a sigmoid function, for example. The neural network is formed by joining a plurality of the foregoing single neurons. In other words, an output from one neuron may be an input to another neuron. An input of each neuron may be associated with a local receiving area of a previous layer, to extract a feature of the local receiving area. The local receiving area may be an area consisting of several neurons.

A deep neural network (DNN) is also referred to as a multi-layer neural network and may be understood as a neural network that includes a first layer (generally referred to as an input layer), a plurality of hidden layers, and a final layer (generally referred to as an output layer). The "plurality" herein does not have a special metric. A layer is considered to be a fully connected layer when there is a full connection between two adjacent layers of the neural network. To be specific, for two adjacent layers (e.g., the i-th layer and the (i+1)-th layer) to be fully connected, each and every neuron in the i-th layer must be connected to each and every neuron in the (i+1)-th layer.

Processing at each layer of the DNN may be relatively straightforward. Briefly, the operation at each layer is indicated by the following linear relational expression: $\vec{y} = \alpha(W\vec{x} + \vec{b})$, where $\vec{x}$ is an input vector, $\vec{y}$ is an output vector, $\vec{b}$ is an offset vector, W is a weight (also referred to as a coefficient), and $\alpha(\cdot)$ is an activation function. At each layer, the operation is performed on an input vector $\vec{x}$, to obtain an output vector $\vec{y}$.

Because there is a large quantity of layers in the DNN, there is also a large quantity of weights W and offset vectors $\vec{b}$. Definitions of these parameters in the DNN are as follows, where the weight W is used as an example. In this example, in a three-layer DNN (i.e. a DNN with three hidden layers), a linear weight from a fourth neuron at a second layer to a second neuron at a third layer is denoted as $W_{24}^3$. The superscript 3 indicates a layer (i.e., the third layer (or layer-3) in this example) of the weight W, and the subscript indicates the output is at layer-3 index 2 (i.e., the second neuron of the third layer) and the input is at layer-2 index 4 (i.e., the fourth neuron of the second layer). Generally, a weight from a k-th neuron at an (L-1)-th layer to a j-th neuron at an L-th layer may be denoted as $W_{jk}^L$. It should be noted that there is no W parameter at the input layer.

In a DNN, a greater number of hidden layers may enable the DNN to better model a complex situation (e.g., a real-world situation). In theory, a DNN with more parameters is more complex, has a larger capacity (which may refer to the ability of a learned model to fit a variety of possible scenarios), and indicates that the DNN can complete a more complex learning task. Training of the DNN is a process of learning the weight matrix. A purpose of the training is to obtain a trained weight matrix, which consists of the learned weights W of all layers of the DNN.

A convolutional neural network (CNN) is a DNN with a convolutional structure. The CNN includes a feature extractor consisting of a convolutional layer and a sub-sampling layer. The feature extractor may be considered as a filter. A convolution process may be considered as performing convolution on a two-dimensional (2D) input image or a convolutional feature map using a trainable filter.

The convolutional layer is a layer of neurons at which convolution processing is performed on an input in the CNN. In a convolutional layer, one neuron may be connected only to a subset of neurons (i.e., not all neurons) in neighboring layers. That is, a convolutional layer generally is not a fully connected layer. One convolutional layer usually includes several feature maps, and each feature map may be formed by some neurons arranged in a rectangle. Neurons at a same feature map share weights. The shared weights may be collectively referred to as a convolutional kernel. Typically, a convolutional kernel is a 2D matrix of weights. It should be understood that the convolutional kernel may be unrelated to a manner and position of image information extraction. A hidden principle behind convolutional layers is that statistical information of a part of an image is the same as that of another part of the image. This means that image information learned from one part of the image may also be applicable for another part of the image. A plurality of convolutional kernels may be used at the same convolutional layer to extract different image information. Generally, a larger quantity of convolutional kernels indicates that richer image information is reflected by a convolution operation.

A convolutional kernel may be initialized as a 2D matrix of random values. In a training process of the CNN, the weights of the convolutional kernel are learned. An advantage of using the convolutional kernel to share weights among neurons in the same feature map is that the connections between convolutional layers of the CNN is reduced (compared to the fully connected layer) and the risk of overfitting is lowered.

In the process of training a DNN, a predicted value outputted by the DNN may be compared to a desired target value (e.g., a ground truth value). A weight vector (which is a vector containing the weights W for a given layer) of each layer of the DNN is updated based on a difference between the predicted value and the desired target value. For example, if the predicted value outputted by the DNN is excessively high, the weight vector for each layer may be adjusted to lower the predicted value. This comparison and adjustment may be carried out iteratively until a convergence condition is met (e.g., a predefined maximum number of iterations has been performed, or the predicted value outputted by the DNN is sufficiently converged with the desired target value). A loss function or an objective function is defined, as a way to quantitatively represent how close the predicted value is to the target value. An objective function represents a quantity to be optimized (e.g., minimized or maximized) in order to bring the predicted value as close to the target value as possible. A loss function more specifically represents the difference between the predicted value and the target value, and the goal of training the DNN is to minimize the loss function.

Backpropagation is an algorithm for training a DNN. Backpropagation is used to adjust (also referred to as update) a value of a parameter (e.g., a weight) in the DNN, so that the error (or loss) in the output becomes smaller. For example, a defined loss function is calculated, from forward propagation of an input to an output of the DNN. Backpropagation calculates a gradient of the loss function with respect to the parameters of the DNN, and a gradient algorithm (e.g., gradient descent) is used to update the parameters to reduce the loss function. Backpropagation is performed iteratively, so that the loss function is converged or minimized.

Reference is made to FIG. 1, which shows an example embodiment of the present disclosure as a system 100. The following description shall not be construed as a limitation to any examples of this disclosure. As shown in the system 100, labeled training data may be stored in a database 130. The database 130 may be in located in a server, a datacenter, or may be provided as a service by a cloud computing service provider. In the context of the present disclosure, labeled training data refers to training data that is used to learn the meta-trained weights for a deblurring neural network 101 (also referred to as the deblurring network 101, for simplicity). The labeled training data includes input-output image pairs, in which an input image is a blurry image and the paired output image (i.e., the expected output image) is the ground-truth clean (i.e., free of blurriness) image. The labeled training data is distinct from application-time training data, which may be unlabeled real-life data (e.g., real-life images captured by an application device 110, discussed below) or unlabeled test data. The application-time data includes blurry images having no paired output image (e.g. no ground-truth clean image). As will be discussed further below, application-time training of the deblurring network 101 can be performed using a single input real-life image, to obtain application-time trained weights for the deblurring network 101 and the deblurring network 101 that includes the application-time trained weights may be used to predict a corresponding single deblurred output image from the single input real-life image.

The database 130 may contain, for example, labeled training data that have been previously collected and commonly used for training models related to image tasks (e.g., image recognition). The input images of the labeled training data stored in the database 130 may alternatively or additionally be images optionally collected (e.g., with user consent) from the application device 110 (which may be a user device). For example, images captured by a camera of the application device 110 and stored on the application device 110 may optionally be anonymized and uploaded to the database 130 for storage as an input image of labeled training data. Labeled training data stored in the database 130 may include input-output image pairs where the input image is a synthesized blurry image from the paired output image (e.g., ground-truth clean image).

As will be discussed further below, training of the deblurring network 101 may be performed using a meta-training device 120, using the training data stored in the database 130. Additionally or alternatively, the meta-training device 120 may train the deblurring network 101 using training data obtained from other sources, such as a distributed storage (or cloud storage platform). The meta-trained deblurring network 101 (i.e., the result of meta-training by the meta-training device 120) has a set of meta-trained weights. The meta-trained deblurring network 101 may be further trained by the application device 110 for deblurring of specific blurred real-life images, according to examples disclosed herein. Application-time training by the application device 110 may be performed using images (e.g., digital photographs) captured by a camera (not shown) of the application device 110. The application device 110 may not have access to the training data stored in the database 130.

Figure 2:
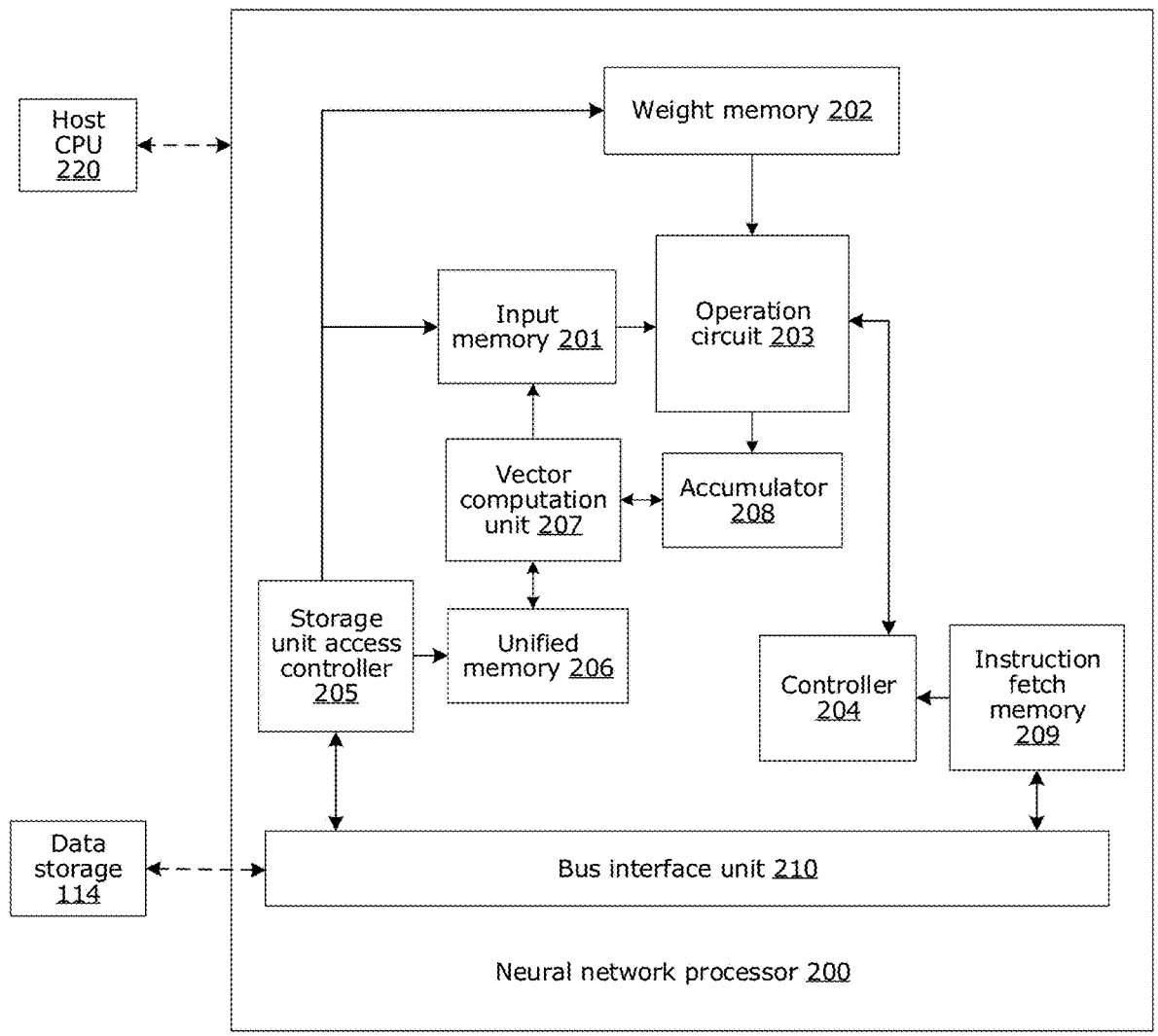
FIG. 2 is a block diagram illustrating an example hardware structure for a neural network processor, in accordance with some embodiments of the present disclosure.

In examples disclosed herein, the meta-trained deblurring network 101 may be implemented in a processing unit 111 of the application device 110. For example, the deblurring network 101 may be encoded in instructions stored in a memory (not shown) of the application device 110, and implemented by the processing unit 111 executing the stored instructions. In some examples, the deblurring network 101 may be encoded in instructions stored in a memory of the processing unit 111 (e.g., weights of the deblurring network 101 may be stored in a corresponding weight memory of the processing unit 111, which may be embodied in a neural network processor 200 as shown in FIG. 2). In some examples, the deblurring network 101 may be implemented (as software and/or hardware) in an integrated circuit of the application device 110. Although FIG. 1 illustrates an example in which the meta-training device 120 is separate from the application device 110, it should be understood that the present disclosure is not limited to this embodiment. In some examples, there may not be separate meta-training device 120 and application device 110. That is, meta-training of the deblurring network 101 and application-time training of the deblurring network 101 may be performed at the same device (e.g. the application device 110).

The application device 110 may be a user device, for example, a client terminal, a mobile terminal, a tablet computer, a notebook computer, an augmented reality (AR) device, virtual reality (VR) device, or an in-vehicle terminal, among other possibilities. The application device 110 may also be a server, a cloud computing platform, or the like, which may be accessed by a user via a user device. In FIG. 1, the application device 110 is provided with an I/O interface 112, which is configured to perform data interaction with an external device. For example, the application device 110 may provide upload data (e.g., image data, such as photographs and/or videos captured by the application device 110) to the database 130 via the I/O interface 112. Although FIG. 1 illustrates an example in which the user directly interacts with the application device 110, it should be understood that the present disclosure is not limited to this embodiment. In some examples, there may be a user device separate from application device 110, and the user interacts with the user device that in turn communicates data to/from the application device 110 via the I/O interface 112.

The application device 110 in this example includes a data storage 114, which may be a system memory (e.g., a random access memory (RAM), a read-only memory (ROM), etc.) or a mass storage device (e.g., a solid state drive, a hard disk drive, etc.). The data storage 114 may store data accessible by the processing unit 111. For example, the data storage 114 may store captured images and/or inpainted images on the application device 110, separately from the processing unit 111.

In some examples, the application device 110 may optionally invoke data, code, or the like from an external data storage system 150, to perform processing, or may store, in the data storage system 150, data, an instruction, or the like obtained through corresponding processing.

It should be noted that FIG. 1 is merely a schematic diagram of an example system architecture 100 according to an embodiment of the present disclosure. Relationships and interactions between the device, the component, the processing unit, and the like that are shown in FIG. 1 are not intended to be limiting to the present disclosure.

FIG. 2 is a block diagram illustrating an example hardware structure of an example neural network processor 200 according to an embodiment of the present disclosure. The neural network processor 200 may be provided on an integrated circuit (also referred to as a computer chip). The neural network processor 200 may be provided in the application device 110 shown in FIG. 1, to perform computation for the processing unit 111 and to implement the deblurring network 101 (including performing application-time training of the deblurring network). Additionally or alternatively, the neural network processor 200 may be provided in the meta-training device 120 shown in FIG. 1, to perform meta-training of the deblurring network 101. All the algorithms of the layers of a neural network (e.g., the layers of the deblurring network 101, discussed further below) may be implemented in the neural network processor 200.

The neural network processor 200 may be any processor that is capable of performing the computations required in a neural network (e.g., to compute massive exclusive OR operations). For example, the neural network processor 200 may be a neural processing unit (NPU), a tensor processing unit (TPU), a graphics processing unit (GPU), or the like. The neural network processor 200 may be a coprocessor to an optional host central processing unit (CPU) 220. For example, the neural network processor 200 and the host CPU 220 may be mounted on the same package. The host CPU 220 may be responsible for performing core functions of the application device 110 (e.g., execution of an operating system (OS), managing communications, etc.). The host CPU 220 may manage operation of the neural network processor 200, for example by allocating a task to the neural network processor 200.

The neural network processor 200 includes an operation circuit 203. A controller 204 of the neural network processor 200 controls the operation circuit 203 to, for example, extract data (e.g., matrix data) from an input memory 201 and a weight memory 202 of the neural network processor 200, and perform data operations (e.g., addition and multiplication operations).

In some examples, the operation circuit 203 internally includes a plurality of processing units (also referred to as process engines (PEs)). In some examples, the operation circuit 203 is a bi-dimensional systolic array. In other examples, the operation circuit 203 may be a uni-dimensional systolic array or another electronic circuit that can implement a mathematical operation such as multiplication and addition. In some examples, the operation circuit 203 is a general matrix processor.

In an example operation, the operation circuit 203 obtains, from the weight memory 202, weight data of a weight matrix B, and caches the weight data in each PE in the operation circuit 203. The operation circuit 203 obtains, from the input memory 201, input data of an input matrix A and performs a matrix operation based on the input data of the matrix A and the weight data of the matrix B. An obtained partial or final matrix result is stored in an accumulator 208 of the neural network processor 200.

In this example, the neural network processor 200 includes a vector computation unit 207. The vector computation unit 207 includes a plurality of operation processing units. If needed, the vector computation unit 207 performs further processing, for example, vector multiplication, vector addition, an exponent operation, a logarithm operation, or magnitude comparison, on an output from the operation circuit 203 (which may be retrieved by the vector computation unit 207 from the accumulator 208). The vector computation unit 207 may be mainly used for computation at a non-convolutional layer or fully-connected layer of a neural network. For example, the vector computation unit 207 may perform processing on computation such as pooling or normalization. The vector computation unit 307 may apply a nonlinear function to an output of the operation circuit 203, for example, a vector of an accumulated value, to generate an activation value, which may be used by the operation circuit 203 as activation input for a next layer of a neural network. In some examples, the vector computation unit 207 generates a normalized value, a combined value, or both a normalized value and a combined value.

The neural network processor 200 in this example includes a storage unit access controller 205 (also referred to as a direct memory access control (DMAC)). The storage unit access controller 205 is configured to access a memory external to the neural network processor 200 (e.g., the data storage 114 of the execution device 110) via a bus interface unit 210. The storage unit access controller 205 may access data from the memory external to the neural network processor 200 and transfer the data directly to one or more memories of the neural network processor 200. For example, the storage access unit controller 205 may directly transfer weight data to the weight memory 202, and may directly transfer the input data to a unified memory 206 and/or the input memory 201. The unified memory 206 is configured to store input data and output data (e.g., a processed vector from the vector computation unit 207).

The bus interface unit 210 is also used for interaction between the storage access unit controller 205 and an instruction fetch memory (also referred to as an instruction fetch buffer) 209. The bus interface unit 210 is further configured to enable the instruction fetch memory 209 to obtain an instruction from a memory external to the neural network processor 200 (e.g., the data storage 114 of the application device 110). The instruction fetch memory 209 is configured to store the instruction for use by the controller 204.

Generally, the unified memory 206, the input memory 201, the weight memory 202, and the instruction fetch memory 209 are all memories of the neural network processor 200 (also referred to as on-chip memories). The data storage 114 is independent from the hardware architecture of the neural network processor 200.

Figure 3:
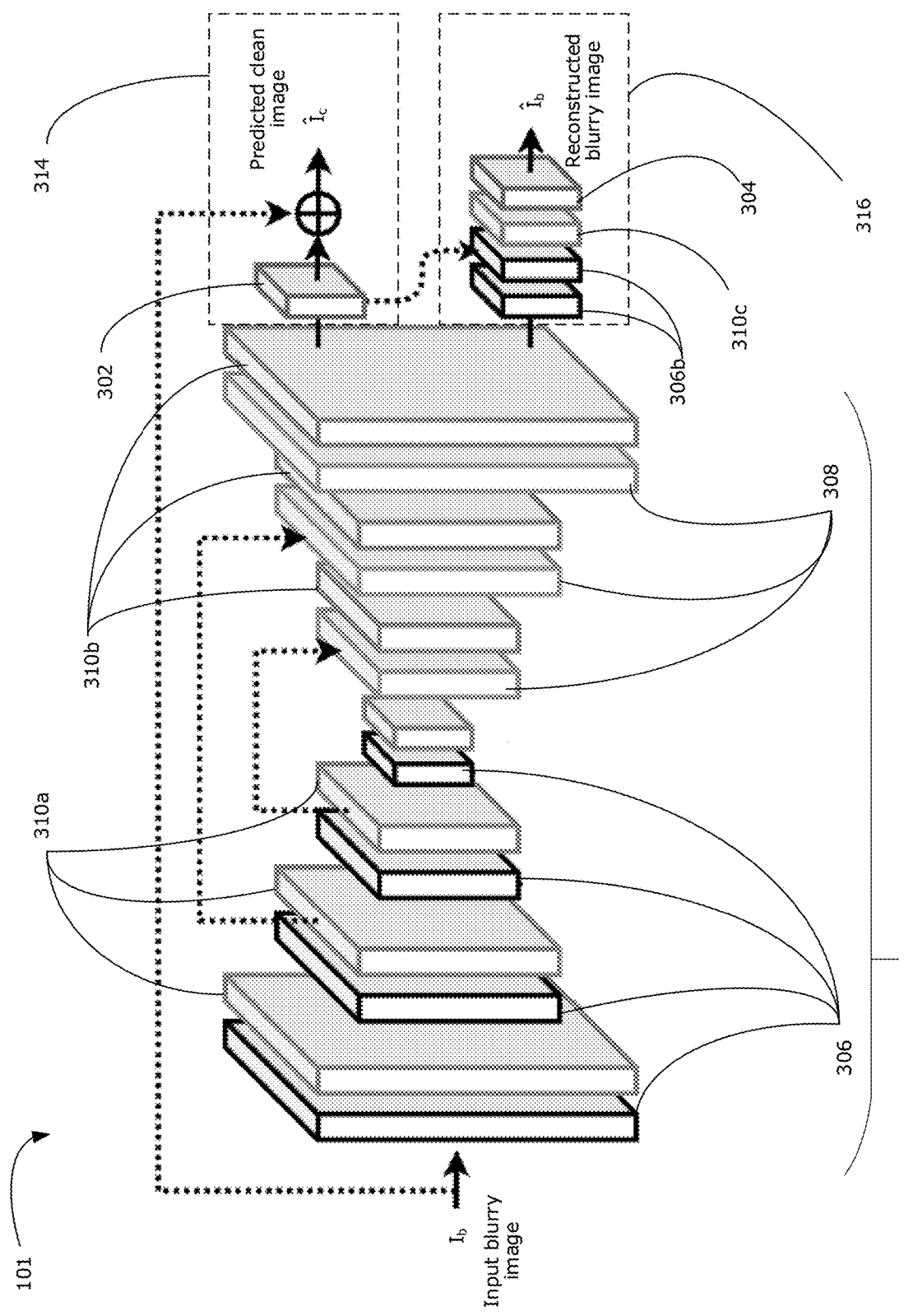
FIG. 3 is a block diagram illustrating an example architecture for a deblurring network, in accordance with some embodiments of the present disclosure.

FIG. 3 is a block diagram illustrating an example architecture of the deblurring network 101. Details for meta-training and application-time training of the deblurring network 101 are discussed further below.

The deblurring network 101 is meta-trained by jointly training an auxiliary task with the primary deblurring task. Input to the deblurring network 101 is a blurry input image (denoted as $I_b$), which may be represented as a 2D matrix encoding individual pixels of the input image in multiple channels (e.g., red-green-blue (RGB) channels). The architecture of the deblurring network 101 is described below with reference to the example of FIG. 3. It should be understood that the architecture of the deblurring network 101 may be modified (e.g., with fewer or greater numbers of neural network layers). In the following discussion, neural network layers (or blocks) of the deblurring network 101 will be referred to as layers for simplicity.

The deblurring network 101 in this example is a single-scale network, having a plurality of convolutional layers 306 a plurality of deconvolutional layers 308 for processing the blurry input image ($I_b$). In this example, each convolutional layer 306 and each deconvolutional layer 308 is followed by a respective residual layer 310a. A first convolutional layer 306 of the deblurring network 101 receives the blurry input image ($I_b$) and performs a convolution operation on the blurry input image to generate an output feature map (feature representation) that encodes features of the blurry input image ($I_b$). The output feature map is provided as an input feature map (i.e. feature representation) to the first residual layer 310a.

Each other respective convolutional layer 306 receives an output feature map (i.e. feature representation) that is the result of processing of an input feature map (i.e. feature representation) by a previous convolutional layer 306, and performs a convolution operation on the input feature map (i.e. feature representation) using a different convolutional kernel. The output feature map (i.e. feature representation) of a convolutional layer 306 encodes features of the blurry input image ($I_b$) when the convolutional layer 306 is the first convolutional layer 306 in the deblurring network 101 or features in an input feature map (i.e. feature representation) when the convolutional layer is another convolutional layer 306 in the deblurring network 101. Each deconvolutional layer 308 decodes the feature map generated by a respective residual layer 310a of the deblurring network 101 to generate an output feature map (i.e. feature representation). The deblurring network 101 has two output layers 302, 304, referred to herein as the primary output layer 302 and the auxiliary output layer 304. The primary output layer 302 is performs a convolution operation to generate a feature map (i.e., feature representation) that is combined with the blurry input image to generate the output image (i.e., the predicted clean image) for the primary deblurring task, and the auxiliary output layer 304 generates the output image (i.e., the reconstructed blurry image) for the auxiliary task. The auxiliary output layer 304 is preceded by auxiliary convolutional layers 306b (followed by an auxiliary residual layer 310c) in this example. Short connections (indicated by dotted arrows) are used to provide a direct path between residual layers 310a (which follow respective convolutional layers 306) to provide the feature maps (feature representations) to residual layers 310b (which following respective deconvolutional layers 308) and a direct path between the primary output layer 302 and the auxiliary convolutional layers 306. Short connections (also referred to as skip connections) may be used in residual neural networks to provide faster learning of the weights of the deblurring network 101.

The deblurring network 101 has a shared subnetwork 312 that includes a plurality of shared layers (including the convolutional layers 306, deconvolutional layers 308, and residual layers 310a, 310b), which are coupled to a primary subnetwork 314 that performs the primary task and an auxiliary subnetwork 312 that performs the auxiliary tasks (where the primary task is the deblurring task, and the auxiliary task is defined to support learning of the deblurring task, as discussed below). This means that training the deblurring network 101 to perform the auxiliary task will also affect (and potentially improve) performance of the primary deblurring task. Additionally, the deblurring network 101 includes a primary subnetwork 314 having a layer (namely the primary output layer 302) specific to the primary deblurring task, and an auxiliary subnetwork 316 having layers (namely the auxiliary convolutional layers 306, auxiliary residual layer 310 and the auxiliary output layer 304) specific to the auxiliary task. The primary subnetwork 314 and the auxiliary subnetwork 316 may also be referred to as the primary branch and the auxiliary branch, respectively. It should be understood that each subnetwork 312, 314, 316 is defined as a respective set of one or more layers of the overall deblurring network 101 (e.g., as indicated in FIG. 3), and is not intended to be independent from the deblurring network 101 as whole. The primary subnetwork 314 processes the feature map (i.e. feature representation) generated by the shared subnetwork 312 to generate the output image (i.e., the predicted deblurred image) for the primary deblurring task, and the auxiliary subnetwork 316 processes the feature map (i.e. feature representation) generated by the shared subnetwork 312 to generate the output image (i.e., the reconstructed blurry image) for the auxiliary task. It should be understood that the deblurring network 101 may be implemented using subnetworks and different layers different from those described in this example. However, the short connection from the primary output layer 302 to the auxiliary convolutional layers 306b is useful, as discussed further below.

The primary deblurring task is to output a predicted clean image (i.e., deblurred image) (denoted as $\hat{I}_c$), given the blurry input image $I_b$. The predicted clean image $\hat{I}_c$ is of the same size and resolution (i.e., same pixel dimensions) as the blurry input image $I_b$. In the example of FIG. 3, the primary deblurring task makes use of residual learning to predict the difference (also referred to as the residual) between the blurry input image $I_b$ and a ground-truth expected output image. The predicted residual is added to the original blurry input image $I_b$ to output the predicted deblurred image $\hat{I}_c$. The auxiliary task in this example is defined to be self-supervised reconstruction, meaning the auxiliary task is to output a reconstructed blurry image (denoted as $\hat{I}_b$), from the blurry input image $I_b$. That is, the auxiliary task performed by the deblurring network 101 is to learn the weights to map the blurry input image $I_b$ to a set of feature maps, and to use the feature maps to reconstruct the blurry image. It should be understood that a different auxiliary task may be defined (instead of a reconstruction task), for example any other auxiliary task that supports learning of the primary deblurring task may be defined, where the auxiliary task can be trained in application-time without requiring ground-truth data separate from the application-time input image (or in which ground-truth data can be easily obtained).

As discussed above, training the deblurring network 101 to perform the auxiliary task also benefits performance of the primary deblurring task. Performing the auxiliary task during training of the deblurring network 101 provides regularization which guides learning of the weights of the deblurring network when the primary deblurring task is performed, which may result in better performance of the primary deblurring task. It should be noted that the weights of the deblurring network 101 learned during training of the includes weights related to blurry information about the blurry input image that can be used to reconstruct the blurry input image, as well as to generate a deblurred output image (i.e. clean output image). The output features of the primary output layer 302 are copied to the auxiliary convolutional layers 306b (also referred to as feature passing) via a short connection, to enable application-time training of the auxiliary task to be backpropagated to update the weights of the deblurring network 101, including the weights in the convolutional kernels and the deconvolutional kernels, to the benefit of the primary task.

Figure 4:
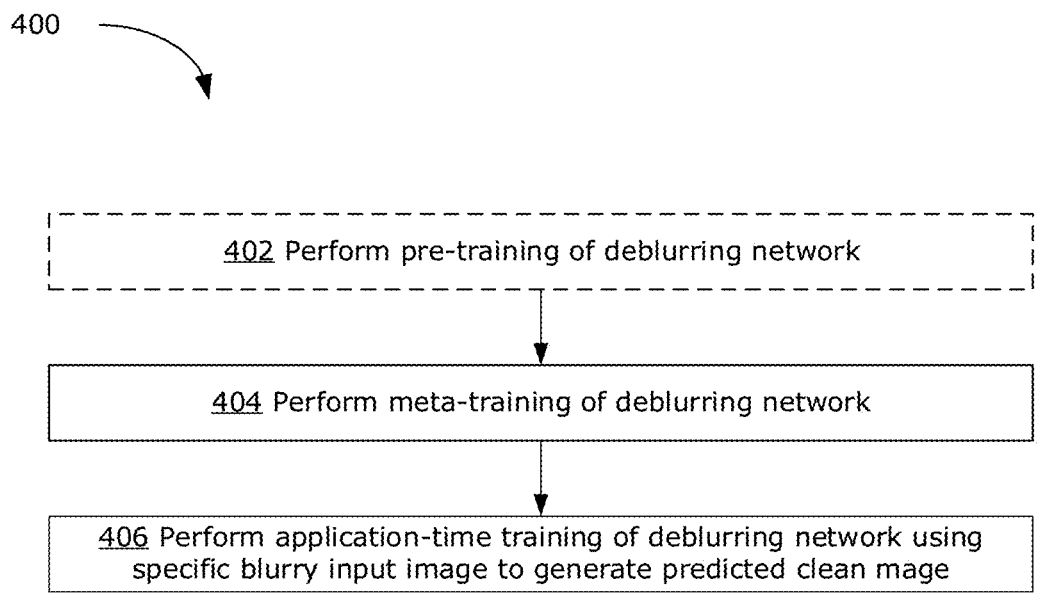
FIG. 4 is a flowchart of an example method for meta-training and application-time training of a deblurring network, in accordance with some embodiments of the present disclosure.

FIG. 4 is a flowchart illustrating an example method 400 for deblurring an input image using the deblurring network 101. The method 400 provides an overview of the different training stages for the deblurring network 101, and may involve steps performed by the meta-training device 120 as well as the application device 110 shown in FIG. 1, for example.

The method 400 may start with optional step 402. At optional step 402, pre-training may be performed. The deblurring network 101 may be pre-trained using labeled training data (e.g., from the database 130), by jointly training the deblurring network 101 to perform both the primary deblurring task and the auxiliary task. Pre-training may be performed, for example, by obtaining the deblurred output image (from the primary subnetwork 314) and the reconstructed blurry image (from the auxiliary subnetwork 316), computing losses for each subnetwork using a loss function and performing backpropagation based on the summation of both losses. The pre-trained weights may then be used as the initial weights at the start of the meta-training at subsequent step 404.

If optional step 402 is not performed, the weights of the deblurring network 101 may be initialized randomly at the start of meta-training. For example, each weight may be set to a respective random value.

At 404, meta-training of the deblurring network 101 is performed. In some examples, the meta-training may be performed by the meta-training device 120 of FIG. 1, using labeled training data from the database 130. In other examples, the meta-training may be performed by the application device 110. If pre-training was performed at step 402, the labeled training data used for meta-training may be different from the labeled training data used for pre-training (e.g., sampled from a different training dataset, or different samples from the same training dataset). Meta-training may be performed until a convergence condition is met (e.g., the loss function is optimized for values of the weights of the deblurring network 101, or a predefined number of training iterations have been completed). Further details of the meta-training will be described below.

The meta-trained weights of the deblurring network 101 are then stored. If the meta-training was performed at the meta-training device 120 that is separate from the application device 110, the meta-training device 120 may transmit the meta-trained weights to the application device 110 and the meta-trained weights may be stored by the application device 110 in its local memory. If the meta-training was performed by the application device 110, the meta-trained weights may be stored directly in the local memory of the application device 110. The deblurring network 101 with the meta-trained weights may be referred to as the meta-trained deblurring network 101.

At 406, application-time training of the deblurring network 101 is performed using a specific blurry input image. The specific blurry input image may be, for example, a real-life image (e.g., digital photograph) captured by a digital camera, for example a standalone digital camera or a digital camera of an electronic device, such as a smartphone, laptop computer, or a tablet, among others. The application-time training of the deblurring network 101 enables the meta-trained weights to be updated to application-time trained weights, to enable the deblurring network 101 to be adapted to perform deblurring of the specific blurry input image. After application-time training of the meta-trained deblurring network 101, the deblurring network 101 having the application-timed trained weights receives the specific blurry input image, generates a predicted clean image (i.e. a deblurred image) from the specific input image, and output the predicted clean image. The result of the application-time training of the deblurring network 101 is an application-time trained deblurring network 101 that performs better than the meta-trained deblurring network 101 in deblurring the specific input image. Further details of the application-time training of the meta-trained deblurring network 101 will be described below.

The predicted clean image generated by the application-time trained deblurring network 101 may be stored, for example in the local memory of the application device 110. The generated predicted clean image may also be displayed (e.g., on a display screen of the application device 110) or otherwise presented to a user. Following generation of the predicted clean image (for a specific blurry input image), the application-time trained deblurring network 101 may revert to the meta-trained deblurring network 101 (i.e., the application-time trained weights may be discarded). For example, the values of the application-time trained weights may be replaced with the previously stored meta-trained weights. Application-time training of the deblurring network 101 may be repeated, starting from the meta-trained weights, for deblurring of each specific blurring input image.

Figure 5:
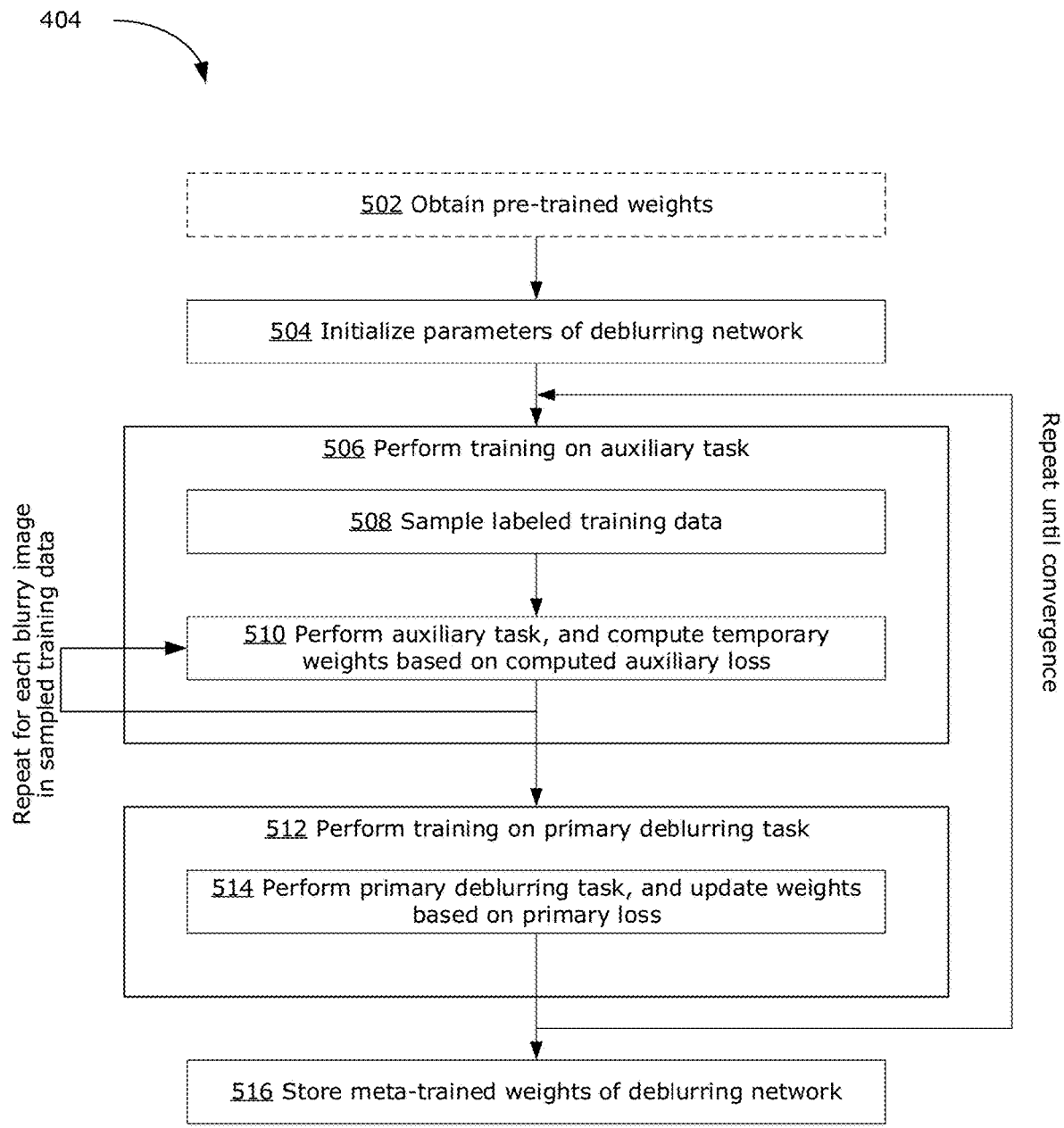
FIG. 5 is a flowchart of an example method for meta-training of a deblurring network, in accordance with some embodiments of the present disclosure.

FIG. 5 is a flowchart illustrating an example method for carrying out step 404, to perform meta-training of the deblurring network 101. The method of FIG. 5 may be performed by the meta-training device 120 shown in FIG. 1, for example. In some examples, meta-training may be performed by the application device 110 instead of the meta-training device 120.

FIG. 6 illustrates example pseudocode 600, which may be used (e.g., as software instructions executable by a processor) to implement the method of FIG. 5. FIGS. 5 and 6 will be discussed together.

Optionally, at 502, pre-trained weights for the deblurring network 101 may be obtained. Step 502 may be performed if optional step 402 of FIG. 4 was performed to pre-train the deblurring network 101.

At 504, the parameters for meta-training of the deblurring network 101 are initialized. For example, if pre-trained weights were obtained at step 502, the deblurring network 101 may be initialized to have the values of the pre-trained weights. If pre-trained weights are not available, the weights of the deblurring network 101 may be randomly initialized (e.g., by setting the value of each weight to a respective random value). Other parameters for meta-training of the deblurring network 101 that may be initialized at step 504 include the gradient step size for updating the weights of the deblurring network 101 using gradient descent.

Step 504 may be performed using instructions represented by line 602 of the pseudocode 600. At line 602, the weights of the deblurring network 101 are denoted by $\theta$, where $\theta^s$ denotes the weights of the shared subnetwork 312 (e.g., weights in the shared layers of the shared subnetwork 312 of the deblurring network 101 as shown in FIG. 3), $\theta^{pri}$ denotes the weights of the layers used only for the primary deblurring task (e.g., weights in the layer of the primary subnetwork 314 of the deblurring network 101 as shown in FIG. 3), and $\theta^{aux}$ denotes the weights of the layers used only for the auxiliary task (e.g., weights in the layer of the auxiliary subnetwork 316 of the deblurring network 101 as shown in FIG. 3). The gradient step sizes for computing gradient descent of the auxiliary loss function and the primary loss function are denoted as $\alpha$ and $\beta$, respectively. The values for $\theta^s$, $\theta^{pri}$ and $\theta^{aux}$ may be obtained from pre-training or may be randomly initialized, for example. The values for $\alpha$ and $\beta$ may be selected according to a desired rate of convergence for the gradient descent of the auxiliary loss function and the primary loss function, for example.

Meta-training involves training the deblurring network 101 to perform the auxiliary task, followed with training the deblurring network 101 to perform the primary deblurring task. The meta-training may involve multiple rounds of training, where each round of training involves training the deblurring network 101 to perform the auxiliary task for a number of iterations followed by one iteration of training of the deblurring network 101 to perform the primary deblurring task. The rounds of training may be repeated until a condition is met (e.g., the auxiliary loss function and the primary loss function have each converged on an optimized value, a predefined number of training rounds has been performed, or all labeled training data in the training dataset have been processed). Line 604 of the pseudocode 600 may represent instructions to repeat training until the convergence condition is met.

One round of training (which includes multiple iterations of training, as explained above) is now described.

At 506, training is performed for the auxiliary task. This may be performed using steps 508 and 510.

At 508, labeled training data is sampled. For example, a batch of training labeled training data may be sampled from the database 130 containing labeled training data. The sampled batch of labeled training data includes paired training images, where each blurry input image is paired with a respective ground-truth clean (i.e., not blurry) image. Each pair of blurry input image and respective ground-truth clean training image may be referred to herein as an input-output image pair. The number of input-output image pairs in the sampled batch may be denoted as N (where N is a positive integer). Then each blurry input image, denoted as $I_b^{(n)}$, is paired with a respective ground-truth clean output image, denoted as $I_c^{(n)}$, where n is an index for each input-output image pair (n being a positive integer up to N). Line 606 of the pseudocode 600 may represent instructions for obtaining the labeled training data.

At 510, the auxiliary task is performed and temporary weights are computed based on the computed auxiliary loss. Step 510 is iterated for each value of the index n in the sampled batch (i.e., is iterated for n=1 to n=N).

For the n-th blurry image, the auxiliary task is performed using the blurry training image $I_b^{(n)}$ as the input image, to generate a reconstructed blurry image, denoted as $\hat{I}_b^{(n)}$. The auxiliary loss (denoted as $L_{aux}$) is computed using an auxiliary loss function, the blurry training image $I_b^{(n)}$, and the reconstructed blurry image $\hat{I}_b^{(n)}$, where the blurry training image $I_b^{(n)}$ is used as the ground-truth. The auxiliary loss $L_{aux}$ may be computed as the absolute distance between the reconstructed blurry image $\hat{I}_b^{(n)}$ and the blurry training image $I_b^{(n)}$, for example. It should be noted that the clean training image $I_c^{(n)}$ is not used for training the deblurring network 101 to perform the auxiliary task. The weights of the deblurring network 101 are then updated by gradient descent of the auxiliary loss with respect to the weights of the deblurring network 101, which may be represented by the following formula:

$$\hat{\theta}^n \leftarrow \theta - \alpha \nabla_\theta L_{aux}(I_b^{(n)}, \hat{I}_b^{(n)}; \theta)$$

where n is the index of the blurry image for one iteration of the training the deblurring network 101 to perform the auxiliary task, $\hat{\theta}^n$ denotes temporary weights of the deblurring network 101 computed based on one iteration, ← denotes an update operation (e.g., replacing the previous values of the weights with the updated values), α is the step size for the gradient descent, and $\nabla_\theta$ is the gradient operation. It should be noted that a respective set of temporary weights $\hat{\theta}^n$ for deblurring network 101 is computed for each iteration of training pf the deblurring network to perform the auxiliary task (i.e., for each training iteration on each respective blurry training image $I_b^{(n)}$).

Each of the N blurry input images in the sampled batch of labeled training data is forward propagated through the deblurring network 101, and a respective set of temporary weights is computed by computing the respective auxiliary loss and updating the weights of the deblurring network 101 by backpropagating the respective auxiliary loss (e.g., using gradient descent). N sets of temporary weights are thus obtained, after which the method proceeds to step 512. Lines 608-614 of the pseudocode may represent instructions for performing step 510.

At 512, training of the deblurring network 101 is performed for the primary deblurring task. This may be performed using step 514.

At 514, the primary deblurring task is performed to predict a predicted clean image, and the weights of the deblurring network 101 are updated based on the computed primary loss. A single iteration of step 514 may be performed for each round of training. To compute the primary loss, a predicted clean image, denoted as $\hat{I}_c^{(n)}$, is generated for every n-th blurry training image $\hat{I}_b^{(n)}$ in the sampled batch.

The primary loss (denoted as $L_{pri}$) is computed using a primary loss function, the ground-truth clean image $\hat{I}_c^{(n)}$, and the predicted clean image $\hat{I}_c^{(n)}$, where the ground-truth clean image $I_c^{(n)}$ (which is paired with the n-th blurry input image $I_b^{(n)}$) from n-th labeled training data in the sampled batch is used as the ground-truth. The primary loss $L_{pri}$ may be computed as the absolute distance between the generated clean image $\hat{I}_c^{(n)}$ and the clean training image $I_c^{(n)}$, for example. Computation of the primary loss $L_{pri}$ is also based on the temporary weights $\hat{\theta}^n$ computed from training the deblurring network 101 to perform the auxiliary task. The primary loss $L_{pri}$ is computed for every labeled training data (input-output image pair) in the sampled batch of labeled training data, and the gradients for all computed primary loss are summed. The weights of the deblurring network 101 are then updated using the summed gradients, which may be represented by the following formula:

$$\theta \leftarrow \theta - \beta \Sigma_n \nabla_\theta L_{pri}(I_c^{(n)}, \hat{I}_c^{(n)}; \hat{\theta}^n)$$

where β is the step size for the gradient descent. Lines 616-618 of the pseudocode may represent instructions for performing step 514.

It should be noted that training the deblurring network 101 based on the primary loss is based on the temporary weights computed from the auxiliary loss. The training of the deblurring network 101 to perform the primary deblurring task is designed such that updates based on auxiliary loss can result in performance gain for the deblurring network 101 when performing the primary deblurring task.

A condition is then checked to determine if meta-training should end. If the condition is not met (e.g., the auxiliary loss function and primary loss function of the deblurring network 101 have not both converged), the method returns to step 506 to perform another round of training. If the condition is met, the method proceeds to step 516.

At 516, after meta-training is complete, the weights learned during meta-training, which may be referred to as the meta-trained weights, are stored. For example, if the meta-training was performed in the meta-training device 120 that is separate from the application device 110, the meta-training device 120 may transmit the meta-trained weights to the application device 110 and the meta-trained weights may be stored by the application device 110 in its local memory. If the meta-training was performed by the application device 110, the meta-trained weights may be stored directly in the local memory of the application device 110.

The meta-trained weights may be stored and used as the starting weights of the deblurring network 101 for application-time training thereof. Application-time training uses a specific application-time blurry image (e.g., a real-life blurry digital image without a corresponding ground truth image) to update the meta-trained weights of the deblurring network 101 in a relatively few number of training iterations (e.g., fewer than 10 iterations, or fewer than 10 iterations). The updated meta-trained weights are application-time trained weights, and the deblurring network 101 with the application-time trained weights achieves better deblurring of the specific blurry input image after application-time training is completed.

As shown in FIG. 4, application-time training of the deblurring network 101 follows the meta-training of the deblurring network 101. However, it should be understood that application-time training of the deblurring network 101 does not necessarily immediately follow meta-training of the deblurring network 101. For example, the meta-trained weights may be maintained in local memory by the application device 110. The meta-trained weights may be adapted to application-time trained weights at a later time when deblurring of a specific blurry input image is desired, for example in response to user input (e.g., a user selecting an option to deblur a captured image) on the application device 110. Application-time training may be considered to be training that takes place during application stage on real-life data (e.g., real-life blurry images, without ground-truth clean images), which is distinct from the meta-training that is performed on training dataset that includes labeled training data (i.e. training data that includes an input-output pair comprising an blurry input image and a corresponding ground-truth clean image).

Figure 7:
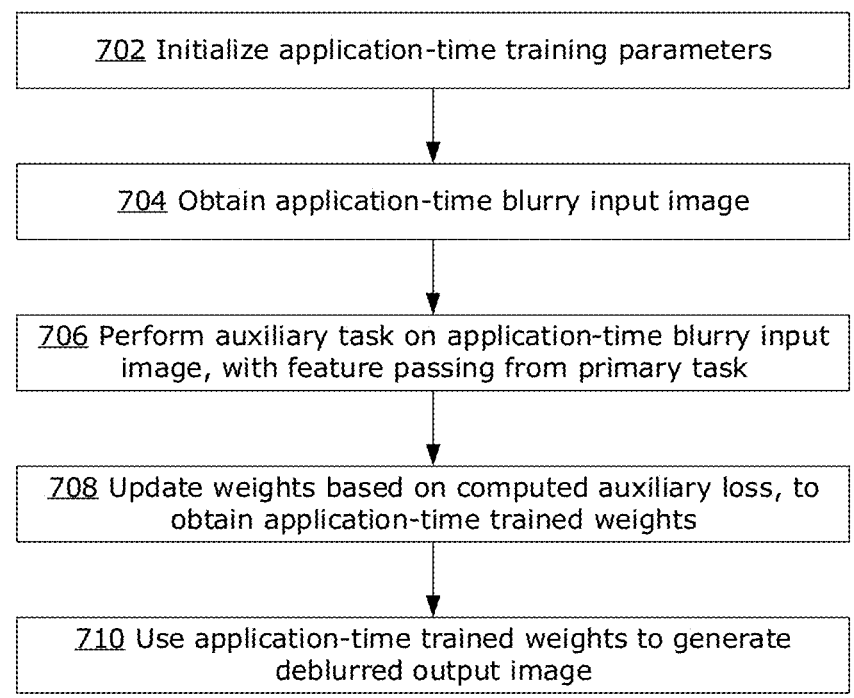
FIG. 7 is a flowchart of an example method for application-time training of a deblurring network, in accordance with some embodiments of the present disclosure.

FIG. 7 is a flowchart illustrating an example method for carrying out step 406, to perform application-time training of the deblurring network 101. The method of FIG. 7 may be performed by the application device 110 shown in FIG. 1, for example.

At 702, the parameters for application-time training of the deblurring network 101 are initialized. Initialization may include obtaining the deblurring network 101 having meta-trained weights (e.g., by initializing the weights of the deblurring network 101 with the values of the stored meta-trained weights). Other parameters for application-time training that may be initialized at step 702 include the gradient step size for adapting the weights using gradient descent.

At 704, an application-time blurry input image is obtained. For example, the application-time blurry input image may be a real-life image captured by a digital camera of the application device 110. The application-time blurry input image may be obtained in real-time as the image is captured, or may be a previously captured image retrieved from a local memory of the application device 110, for example.

In application-time training of the deblurring network 101, the weights of the deblurring network 101 are updated via further training the deblurring network 101 to perform the auxiliary task (e.g., a self-supervised auxiliary reconstruction task). Because the deblurring network 101 (see FIG. 3) includes feature passing from the primary subnetwork 314 to the auxiliary subnetwork 316, updating of the weights of the deblurring network 101 based on the auxiliary task also benefits performance of the primary deblurring task.

At 706, the auxiliary task is performed on the application-time blurry input image to predict a reconstructed blurring image. The auxiliary task in this example is reconstruction of the blurry input image, with feature passing from the primary deblurring task. However, as discussed previously, the auxiliary task may be defined as any other auxiliary task that supports learning of the primary deblurring task (i.e., learning to perform the auxiliary task enables the deblurring network 101 to learn weights to generate feature maps that are relevant to performing the primary task).

At 708, the weights of the deblurring network 101 (which were initialized to be the meta-trained weights at step 702) are updated based on the computed auxiliary loss. The updated weights of the deblurring network 101 are referred to as application-time trained weights. Computation of the auxiliary loss may be the same computation as that used for the auxiliary loss in meta-training (e.g., as shown at line 612 of the pseudocode 600). That is, the auxiliary loss may be computed in accordance with an auxiliary loss function (which is the same auxiliary loss function used in meta-training), the application-time blurry input image, and the reconstructed blurring image. The updating of the weights of the deblurring network 101 may be iterated (by repeating steps 706 and 708) over a few iterations (e.g., fewer than 10, or fewer than 5 iterations). Alternatively, steps 706 and 708 may be performed only once, as a single iteration. Generally, the number of iterations performed during application-time training should be equal to the number of iterations performed when performing the auxiliary task during meta-training, for better performance.

At 710, after the application-time training is complete (e.g., after a defined number of iterations of steps 706 and 708 have been performed) the deblurring network 101 with the application-time trained weights is used to generate the predicted clean image for the application-time blurry input image. The predicted clean image may be stored locally on the application device 110 and/or may be outputted to a display device (e.g., a display screen of the application device 110) for viewing by a user, for example.

In various examples, the present disclosure has described methods and systems fordeblurring of images. A machine-learning based approach is described, which may enable dynamic scene deblurring as well as deblurring of images with uniform image blurriness.

The disclosed approach to training the deblurring network, which involves meta-training and application-time (or test-time) training to perform an auxiliary task (also referred to as meta-auxiliary learning) may enable the weights of the deblurring network 101 to be adapted to each specific application-time input image in a relatively few number of iterations (e.g., fewer than 5 application-time iterations). This fast adaptation of weights of the deburring network 101 may enable the disclosed deblurring methods and systems to be useful in practical applications (e.g., for deblurring of real-life images captured by a digital camera of an electronic device).

The deblurring network is designed (e.g. has an architecture) such that training on an auxiliary task (e.g., self-supervised auxiliary reconstruction task) benefits the performance of the primary deblurring task.

In various evaluation tests, examples of the present disclosure have been found to perform significantly better than some other existing machine learning-based deblurring techniques that do not implement application-time adaptation.

The present disclosure has described examples in the context of image deblurring, including deblurring of captured digital images. It should be understood that the present disclosure may be applicable to deblurring of both static images (e.g., digital photographs) and video images (e.g., where each image to be deblurred is a respective frame of a video).

Although described in the context of deblurring, it should be understood that the present disclosure may be applicable to other image restoration tasks, such as dehazing, denoising, or deraining, among others. For example, the primary deblurring task may be instead a primary dehazing task, a primary denoising task, or a primary deraining task. It should be understood that the present disclosure is not intended to be limited to only image deblurring. Any task that would benefit from application-time training, and where ground-truth data is not available in application-time training, may benefit from examples of the present disclosure.

A person of ordinary skill in the art may be aware that, in combination with the examples described in the embodiments disclosed in this disclosure, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

It should be understood that the disclosed systems and methods may be implemented in other manners. The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments. In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this disclosure essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a universal serial bus (USB) flash drive, a removable hard disk, a read-only memory (ROM), a random access memory (RAM), a magnetic disk, or an optical disc, among others.

The foregoing descriptions are merely specific implementations of this application, but are not intended to limit the protection scope of this disclosure. Any variation or replacement readily figured out by a person skilled in the art within the technical scope disclosed in this disclosure shall fall within the protection scope of this disclosure.

The invention claimed is:

1. A method for image deblurring, comprising:
obtaining a deblurring neural network with meta-trained weights, wherein the meta-trained weights are previously obtained by meta-training the deblurring neural network on both a primary deblurring task and an auxiliary reconstruction task;
obtaining an application-time blurry input image;
performing application-time training of the deblurring neural network with the meta-trained weights using the application-time blurry input image, to obtain application-time trained weights for the deblurring neural network, by:
performing the auxiliary reconstruction task on the application-time blurry input image to predict a reconstructed blurry image; and
updating the meta-trained weights of the deblurring neural network based on an auxiliary loss computed in accordance with an auxiliary loss function, the application-time blurry input image, and the reconstructed blurry image; and
after application-time training is complete, generating a deblurred output image from the application-time blurry input image using the deblurring neural network having application-time trained weights;
wherein the deblurring neural network comprises:
a shared subnetwork for processing the application-time blurry input image, the shared subnetwork being coupled to a primary subnetwork configured to perform the primary deblurring task and an auxiliary subnetwork configured to perform the auxiliary reconstruction task;
the primary subnetwork comprising a primary output neural network layer for performing the primary deblurring task, the primary subnetwork processing output from the shared subnetwork to generate the deblurred output image; and
the auxiliary subnetwork comprising an auxiliary output neural network layer for performing the auxiliary reconstruction task, the auxiliary subnetwork processing output from the shared subnetwork to generate the reconstructed blurry image.

2. The method of claim 1, wherein the application-time training is performed for multiple iterations on the application-time blurry input image, the application-time blurry input image being a single blurry image, wherein each iteration includes performing the auxiliary reconstruction task and updating the weights of the deblurring neural network.

3. The method of claim 2, wherein the application-time training is performed for a maximum of five iterations.

4. The method of claim 1, wherein the auxiliary reconstruction task is performed with feature passing from the primary deblurring task.

5. The method of claim 1, wherein features outputted by the primary output neural network layer are copied to a neural network layer of the auxiliary subnetwork.

6. The method of claim 1, wherein, in the primary subnetwork, output from the primary output neural network layer represents residual difference between the deblurred output image and the application-time blurry input image, and the residual difference is added to the application-time blurry input image to generate the deblurred output image.

7. The method of claim 1, wherein the meta-training of the deblurring neural network is performed using a training dataset comprising input-output pairs of labeled training data.

8. The method of claim 1, further comprising obtaining the deblurring neural network with meta-trained weights by meta-training the deblurring neural network prior to the application-time training by:
initializing weights of the deblurring neural network;
performing a round of meta-training of the deblurring neural network to perform both the primary deblurring task and the auxiliary reconstruction task, to obtain the meta-trained weights, by:
sampling a sampled batch of training data, the sampled batch comprising blurry training images, each blurry training image being paired with a corresponding clean training image in the sampled batch;
for each given blurry training image in the sampled batch, performing the auxiliary reconstruction task on the given blurry training image to predict a respective reconstructed blurry image, and computing a respective set of temporary weights based on an auxiliary loss computed in accordance with an auxiliary loss function, the given blurry training image, and the respective reconstructed blurry image;
for each given pair of blurry training image and corresponding clean training image in the sample batch, performing the primary deblurring task to predict a respective predicted clean image, and computing a respective primary loss in accordance with a primary loss function, the corresponding clean training image, the respective predicted clean image, and the respective set of temporary weights; and
updating the weights of the deblurring neural network using summed gradients of the respective computed primary losses; and
after meta-training is complete, storing the meta-trained weights.

9. A device for deblurring images, comprising:
a processor configured to execute instructions to cause the device to:
obtain a deblurring neural network with meta-trained weights, wherein the meta-trained weights are previously obtained by meta-training the deblurring neural network on both a primary deblurring task and an auxiliary reconstruction task;
obtain an application-time blurry input image;
perform application-time training of the deblurring neural network with the meta-trained weights using the application-time blurry input image, to obtain application-time trained weights for the deblurring neural network, by:
performing the auxiliary reconstruction task on the application-time blurry input image to predict a reconstructed blurry image; and
updating the meta-trained weights of the deblurring neural network based on an auxiliary loss computed in accordance with an auxiliary loss function, the application-time blurry input image, and the reconstructed blurry image; and
after application-time training is complete, generate a deblurred output image from the application-time blurry input image using the deblurring neural network having application-time trained weights;

wherein the deblurring neural network comprises:

a shared subnetwork for processing the application-time blurry input image, the shared subnetwork being coupled to a primary subnetwork configured to perform the primary deblurring task and an auxiliary subnetwork configured to perform the auxiliary reconstruction task;

the primary subnetwork comprising a primary output neural network layer for performing the primary deblurring task, the primary subnetwork processing output from the shared subnetwork to generate the deblurred output image; and the auxiliary subnetwork comprising an auxiliary output neural network layer for performing the auxiliary reconstruction task, the auxiliary subnetwork processing output from the shared subnetwork to generate a reconstructed blurry image.

10. The device of claim 9, wherein the application-time training is performed for multiple iterations on the application-time blurry input image, the application-time blurry input image being a single blurry image, wherein each iteration includes performing the auxiliary reconstruction task and updating the weights of the deblurring neural network.

11. The device of claim 10, wherein the application-time training is performed for a maximum of five iterations.

12. The device of claim 9, wherein the auxiliary reconstruction task is performed with feature passing from the primary deblurring task.

13. The device of claim 9, wherein features outputted by the primary output neural network layer are copied to a neural network layer of the auxiliary subnetwork.

14. The device of claim 10, wherein the meta-training of the deblurring neural network is performed using a training dataset comprising input-output pairs of labeled training data.

15. The device of claim 9, wherein, in the primary subnetwork, output from the primary output neural network layer represents residual difference between the deblurred output image and the application-time blurry input image, and the residual difference is added to the application-time blurry input image to generate the deblurred output image.

16. The device of claim 9, wherein the processor is further configured to execute instructions to cause the device to obtain the deblurring neural network with meta-trained weights by meta-training the deblurring neural network prior to the application-time training by:

initializing weights of the deblurring neural network;

performing a round of meta-training of the deblurring neural network to perform both the primary deblurring task and the auxiliary reconstruction task, to obtain the meta-trained weights, by:

sampling a sampled batch of training data, the sampled batch comprising blurry training images, each blurry training image being paired with a corresponding clean training image in the sampled batch;

for each given blurry training image in the sampled batch, performing the auxiliary reconstruction task on the given blurry training image to predict a respective reconstructed blurry image, and computing a respective set of temporary weights based on an auxiliary loss computed in accordance with an auxiliary loss function, the given blurry training image, and the respective reconstructed blurry image;

for each given pair of blurry training image and corresponding clean training image in the sample batch, performing the primary deblurring task to predict a respective predicted clean image, and computing a respective primary loss in accordance with a primary loss function, the corresponding clean training image, the respective predicted clean image, and the respective set of temporary weights; and updating the weights of the deblurring neural network using summed gradients of the respective computed primary losses; and after meta-training is complete, storing the meta-trained weights.

17. A non-transitory computer readable medium having instructions stored thereon, wherein the instructions are executable by a processor of a computing device to cause the computing device to:

obtain a deblurring neural network with meta-trained weights, wherein the meta-trained weights are previously obtained by meta-training the deblurring neural network on both a primary deblurring task and an auxiliary reconstruction task;

obtain an application-time blurry input image;

perform application-time training of the deblurring neural network with the meta-trained weights using the application-time blurry input image, to obtain application-time trained weights for the deblurring neural network, by:

performing the auxiliary reconstruction task on the application-time blurry input image to predict a reconstructed blurry image; and updating the meta-trained weights of the deblurring neural network based on an auxiliary loss computed in accordance with an auxiliary loss function, the application-time blurry input image, and the reconstructed blurry image; and after application-time training is complete, generate a deblurred output image from the application-time blurry input image using the deblurring neural network having application-time trained weights;

wherein the deblurring neural network comprises:

a shared subnetwork for processing the application-time blurry input image, the shared subnetwork being coupled to a primary subnetwork configured to perform the primary deblurring task and an auxiliary subnetwork configured to perform the auxiliary reconstruction task;

the primary subnetwork comprising a primary output neural network layer for performing the primary deblurring task, the primary subnetwork processing output from the shared subnetwork to generate the deblurred output image; and the auxiliary subnetwork comprising an auxiliary output neural network layer for performing the auxiliary reconstruction task, the auxiliary subnetwork processing output from the shared subnetwork to generate a reconstructed blurry image.

18. The non-transitory computer readable medium of claim 17, wherein the auxiliary reconstruction task is performed with feature passing from the primary deblurring task.

19. The non-transitory computer readable medium of claim 17, wherein features outputted by the primary output neural network layer are copied to a neural network layer of the auxiliary subnetwork.

20. The non-transitory computer readable medium of claim 17, wherein, in the primary subnetwork, output from the primary output neural network layer represents residual difference between the deblurred output image and the application-time blurry input image, and the residual difference is added to the application-time blurry input image to generate the deblurred output image.

* * * * *